(12) United States Patent
Chen (10) Patent No.: US 9,016,855 B2
(45) Date of Patent: Apr. 28, 2015

(54) EYE-LENS DEVICE

(71) Applicant: Lin Yuan Chen, Tainan (TW)

(72) Inventor: Lin Yuan Chen, Tainan (TW)

( * ) Notice: Subject to any disclaimer, the term of this patent is extended or adjusted under 35 U.S.C. 154(b) by 130 days.

(21) Appl. No.: 13/838,591

(22) Filed: Mar. 15, 2013

(65) Prior Publication Data

US 2014/0218677 A1    Aug. 7, 2014

(30) Foreign Application Priority Data

Feb. 7, 2013    (TW) .............................. 102104822 A (51) Int. Cl.
     *G02C 1/04*      (2006.01)
     *G02C 5/14*      (2006.01)
     *G02C 5/10*      (2006.01)

(52) U.S. Cl.
     CPC .............. *G02C 5/14* (2013.01); *G02C 2200/02* (2013.01); *G02C 1/04* (2013.01); *G02C 5/10* (2013.01); *G02C 5/146* (2013.01)

(58) Field of Classification Search
     CPC .............. G02C 1/04; G02C 1/10; G02C 5/00; G02C 5/14; G02C 5/146; G02C 5/22; G02C 5/2209; G02C 7/02; G02C 7/022; G02C 11/00; G02C 2200/02; G02C 2200/06; G02C 2200/08
     USPC ........... 351/41, 103–106, 109, 111, 121, 140, 351/149, 153, 154
     See application file for complete search history.

(56) References Cited

U.S. PATENT DOCUMENTS

| | | | | |
|---|---|---|---|---|
| 8,905,539 | B2 * | 12/2014 | Chen | 351/47 |
| 2006/0146276 | A1 * | 7/2006 | Park | 351/47 |
| 2006/0290880 | A1 * | 12/2006 | Yu | 351/41 |
| 2014/0098337 | A1 * | 4/2014 | Chen | 351/153 |

* cited by examiner

*Primary Examiner* — Huy K Mai
(74) *Attorney, Agent, or Firm* — Rosenberg, Klein & Lee (57) ABSTRACT

An eye-lens device includes a frame, at least a lens unit, two first magnets, and two fasteners. The frame includes at least a lens-holding portion and two magnet-seats. The lens unit is held by the lens-holding portion. The first magnets are disposed at the magnet-seats respectively. Each of the fasteners is disposed pivotally to the frame and includes a second magnet. The lens unit is fastened by the attraction of the first and second magnets when the fasteners rotate relative to the frame.

13 Claims, 9 Drawing Sheets

EYE-LENS DEVICE

BACKGROUND OF THE INVENTION

1. Field of the Invention

The invention relates to an eye-lens device and, in particular, to a eye-lens device which has at least one lens fixed by magnetic attraction.

2. Description of the Prior Art

In general, a pair of eyeglasses mainly include a frame and two temples respectively pivoted on two sides of the frame. The frame includes two rims, and the inner edge of each of the rims has a slot to hold the corresponding lens. Accordingly, the sidewalls of the slot can block the lenses to prevent them from leaving the frame. In this case, however, the lens needs to be hard pressed into the slot to be fixed to the frame although the frame is a little flexible. In addition, the user's improper assembling might cause the lens or frame to be broken or easily scratched.

SUMMARY OF THE INVENTION

In view of the foregoing problem, an objective of the invention is to provides an eye-lens device whose lens can be fixed and unloaded easily so as to improve the usability and extend the lifespan of the product.

To achieve the above objective, an eye-lens device according to the invention includes a frame, at least a lens unit, two first magnets, and two fasteners. The frame includes at least a lens-holding portion and two magnet-seats. The lens unit is held by the lens-holding portion. The first magnets are disposed at the magnet-seats respectively. Each of the fasteners is disposed pivotally to the frame and includes a second magnet. The lens unit is fastened by the attraction of the first and second magnets when the fasteners rotate relative to the frame.

As mentioned above, according to the eye-lens device of the invention, the frame includes a first magnet and the fastener includes a second magnet. Besides, the fastener is disposed pivotally to the frame and can rotate relative to the frame. When the fastener rotates relative to the frame, the first magnet and the second magnet can attract each other so that the lens unit and the fastener can be both fixed. Besides, when the fastener rotates again to make the second magnet separate from the first magnet, the lens unit will be taken off. Accordingly, either the assembly or disassembly, the lens doesn't need to be pushed hard into the slot of the frame (as the conventional art) so that the lens can be prevented from being damaged. Therefore, the lens of the eye-lens device of the invention is very easy to be fixed, thereby improving the usability and extending the lifespan of the product. Besides, with the convenient assembly and disassembly of the invention, the user can easily replace the lens.

DETAILED DESCRIPTION OF THE INVENTION

Figure 1:
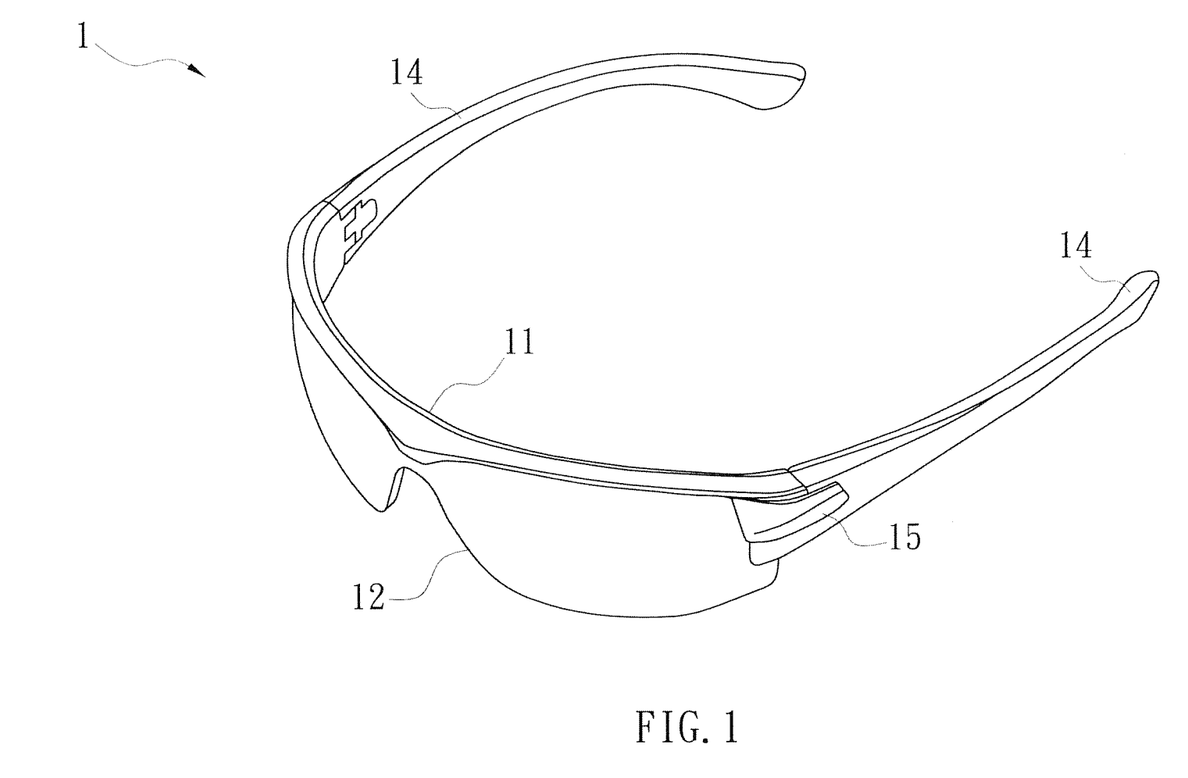
FIG. 1 is a schematic diagram of an eye-lens device of a preferred embodiment of the invention.
Figure 2:
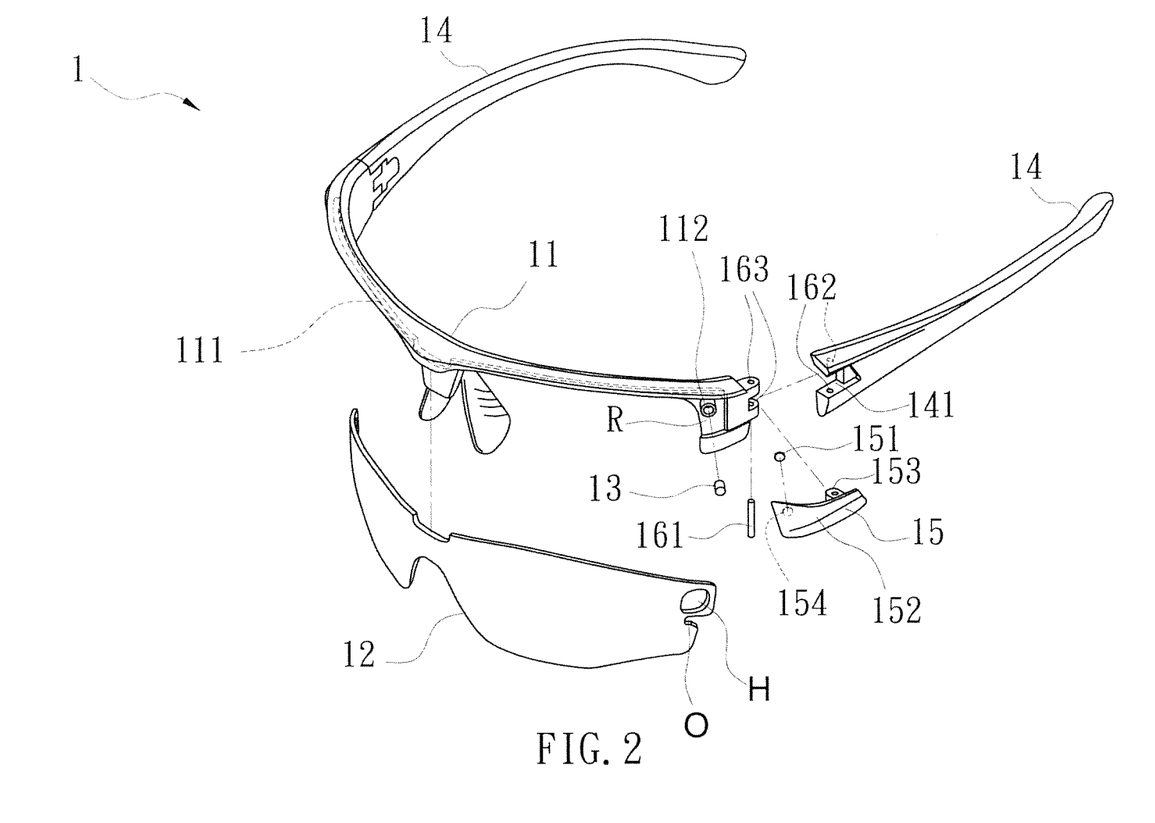
FIG. 2 is a schematic diagram showing partial exploded structure of the eye-lens device in FIG. 1.

FIG. 1 is a schematic diagram of an eye-lens device 1 of a preferred embodiment of the invention, and FIG. 2 is a schematic diagram showing partial exploded structure of the eye-lens device 1. As shown in FIGS. 1 and 2, the eye-lens device 1 includes a frame 11, at least one lens unit 12, two first magnets 13 and two fasteners 15. In the invention, the eye-lens device 1 is not limited in type, which can be sunglasses, safety eyeglasses, nearsighted eyeglasses, farsighted spectacles, snow eyeglasses, or the like.

The frame 11 functions as the main part of the eye-lens device 1. The frame 11 of this embodiment is not limited in shape or curvature, which can be changed according to the practical requirements. The frame 11 is also not limited in material, which can be made by, for example, metal, alloy or plastic material. The frame 11 has at least one lens-holding portion 111 and two magnet-seats 112, and the lens unit 12 is held by the lens-holding portion 111. In this embodiment, the lens-holding portion 111 has a slot for holding the lens unit 12. The width of the slot can be substantially the same as or slightly larger than the width of the lens unit 12. In this embodiment, because the lens unit 12 is just one piece, the number of the lens-holding portion 111 is just one accordingly.

The magnet-seat 112 is used to fix a first magnet 13. In this embodiment, the magnet-seats 112 are respectively disposed on opposite sides of the frame 11, and here for example, are disposed on the two outer sides of the frame 11. Besides, the lens-holding portion 111 has a recess R where the magnet-seat 112 is disposed, so that the magnet-seat 112 is lower relatively.

The lens unit 12 includes at least one lens, and for example, includes only one lens, which, however, covers the range of two eyes of the user. In other embodiments, the lens unit 12 can include two separate lenses, each of which just covers the range of the corresponding eye of the user, and besides, the two lenses are symmetrically disposed to the lens-holding portion 111. In the embodiment, the lens is not limited in type, which can be a nearsighted lens, a farsighted lens, a multi-focus lens, or a filter lens. The lens is held by the lens-holding portions 111, and can be accommodated or clipped in the slot of the lens-holding portion 111. Besides, the lens unit 12 can have two holes H so that the first magnet 13 and a second magnet 151 can pass through the hole H to connect each other. Furthermore, the hole H can be a closed hole or an open hole, and the closed hole is instanced in this embodiment. By the way, the open hole means the hole is formed by concaving the edge of the lens unit 12. The lens unit 12 can have an opening O, the function of which will be illustrated later. The opening O is disposed at an edge of the lens 12. In other embodiments, the opening O can be replaced by a through hole. The opening O is disposed corresponding to a part of the recess R.

The first magnets 13 are respectively disposed in the magnet-seats 112. Herein, the magnet-seat 112 has a hole, and the first magnet 13 can be accommodated in the hole and thus fixed tightly in the magnet-seat 112. In other embodiments, the first magnet 13 can be fixed to the magnet-seat 112 by other ways, such as by an adhesive or a clip.

Besides, the eye-lens device 1 of this embodiment can further include two temples 14, which are respectively connected on two opposite sides of the frame 11 in the integral form of one piece, or by other ways (such as adhering, soldering or pivoting), or by other elements. Herein, the temple 14 is disposed pivotally to the frame 11 so as to rotate around the frame 11. The temples 14 are used to be laid on the user's ears. In the embodiment, the temples 14 are not limited in shape and material. For example, each of the temple 14 can have a hook or no hook, and it can be made by metal, alloy, or plastic material. The temple 14 has an opening 141 which can provide space for the rotation of the fastener 15. In the embodiment, the temple 14 is disposed pivotally on the frame 11 by a pivoting structure so that the temple 14 can rotate relative to the frame 11. In other embodiments, the temple 14 can be fixed to the frame, and is unable to rotate relative to the frame. The pivoting structure includes an axle 161, the temple 14 has two holes 162 disposed near the opening 141, and an end of the frame 11 has two holes 163. Accordingly, the axle 161 passes through the holes 162 and the holes 163 for constituting the pivoting structure. The pivoting structure as mentioned above is just for example, but not for limiting the scope of the invention. Other kinds of pivoting structures also can be applied to this embodiment.

The fastener 15 is disposed pivotally to the frame 11, and includes a second magnet 151. The fastener 15 of the invention is not limited in shape and material. For example, the fastener 15 can be made by metal, alloy or plastic material. Herein, the fastener 15 includes a blocking portion 152, a pivoting portion 153, and a containing portion 154. The pivoting portion 153 is used to make the fastener 15 disposed pivotally on the frame 11. The axle 161 can pass through the pivoting portion 153. The containing portion 154 is used to contain the second magnet 151. The pivoting portion 153 and the containing portion 154 can be disposed on the same side of the blocking portion 152, such as on the inner side of the blocking portion 152. The fastener 15 is disposed pivotally to the frame 11 by a pivoting structure. In this embodiment, the fastener 15 and the temple 14 are disposed pivotally to the frame 11 by the same axle. In other embodiments, the fastener 15 and the temple 14 can be disposed pivotally to the frame 11 by different axles.

Figure 3:
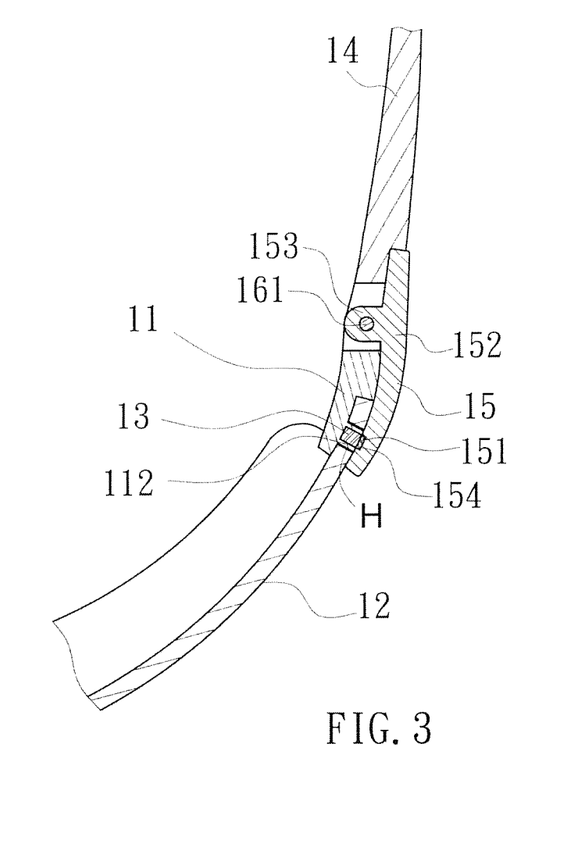
FIGS. 3 and 4 are schematic diagrams showing the rotation of the fastener according to a preferred embodiment of the invention.
Figure 4:
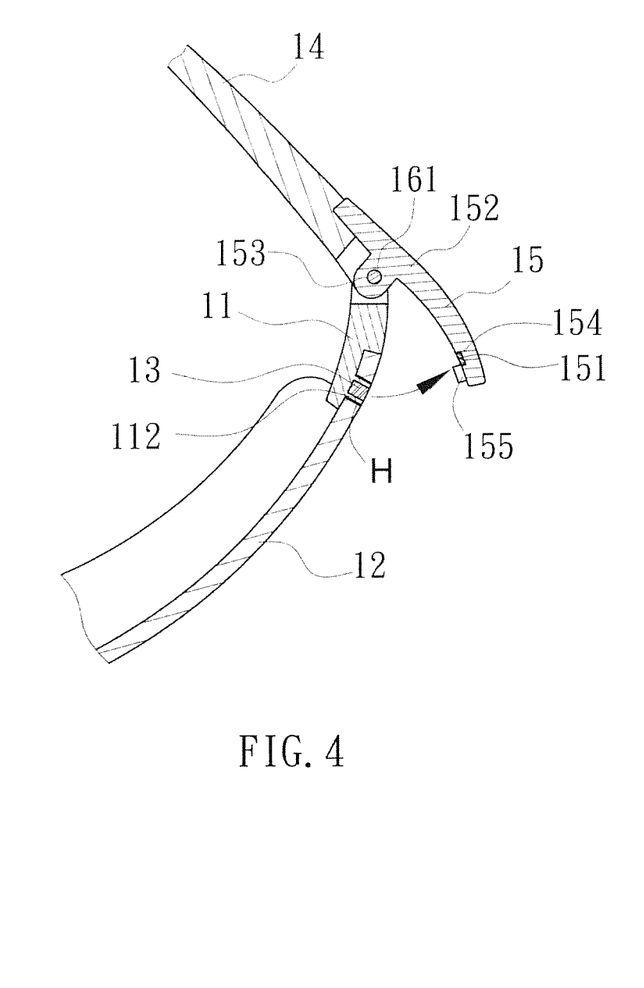

The fastener 15 can rotate relative to the frame 11, causing the first magnet 13 and the second magnet 151 to attract each other to fix the lens unit 12. FIGS. 3 and 4 are schematic diagrams showing the rotation of the fastener 15. As shown in FIG. 3, when the fastener 15 rotates and the second magnet 151 comes closer to the first magnet 13, the lens of the lens unit 12 is fixed by the attraction of the first and second magnets 13 and 151 which are connected through the hole Fl of the lens unit 12. Besides, the attraction of the first and second magnets 13 and 151 also causes the fastener 15 to be fixed. As shown in FIG. 3, the fastener 15 presses an outer surface (the surface far from the user's eyes) of the lens unit 12, and in detail, the outer surface is blocked by the blocking portion 152 of the fastener 15. As shown in FIG. 4, when the fastener 15 rotates again and thus the second magnet 151 separates from the first magnet 13, the lens unit 12 will be taken off.

Figure 5:
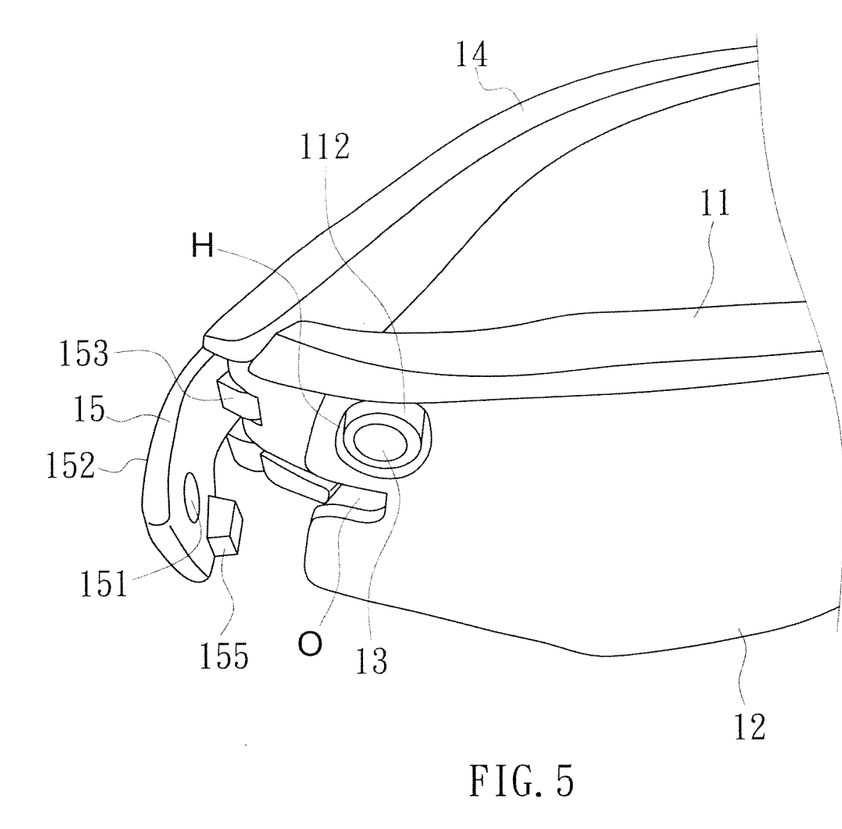
FIG. 5 is a schematic diagram of the fastener and the lens unit according to a preferred embodiment of the invention.

FIG. 5 is a schematic diagram of the fastener 15 and a lens unit 12 of the embodiment. As shown in FIG. 5, the fastener 15 further includes a supporting portion 155. The lens unit 12 has two openings O, which are corresponding to the recesses R of the frame 11 respectively (also referring to FIG. 2). The supporting portion 155 can move into the opening O (maybe a through hole otherwise) and the recess R by the rotation of the fastener 15, pushing the lens unit 12 upwards to make the lens unit 12 fixed more tightly.

Figure 6:
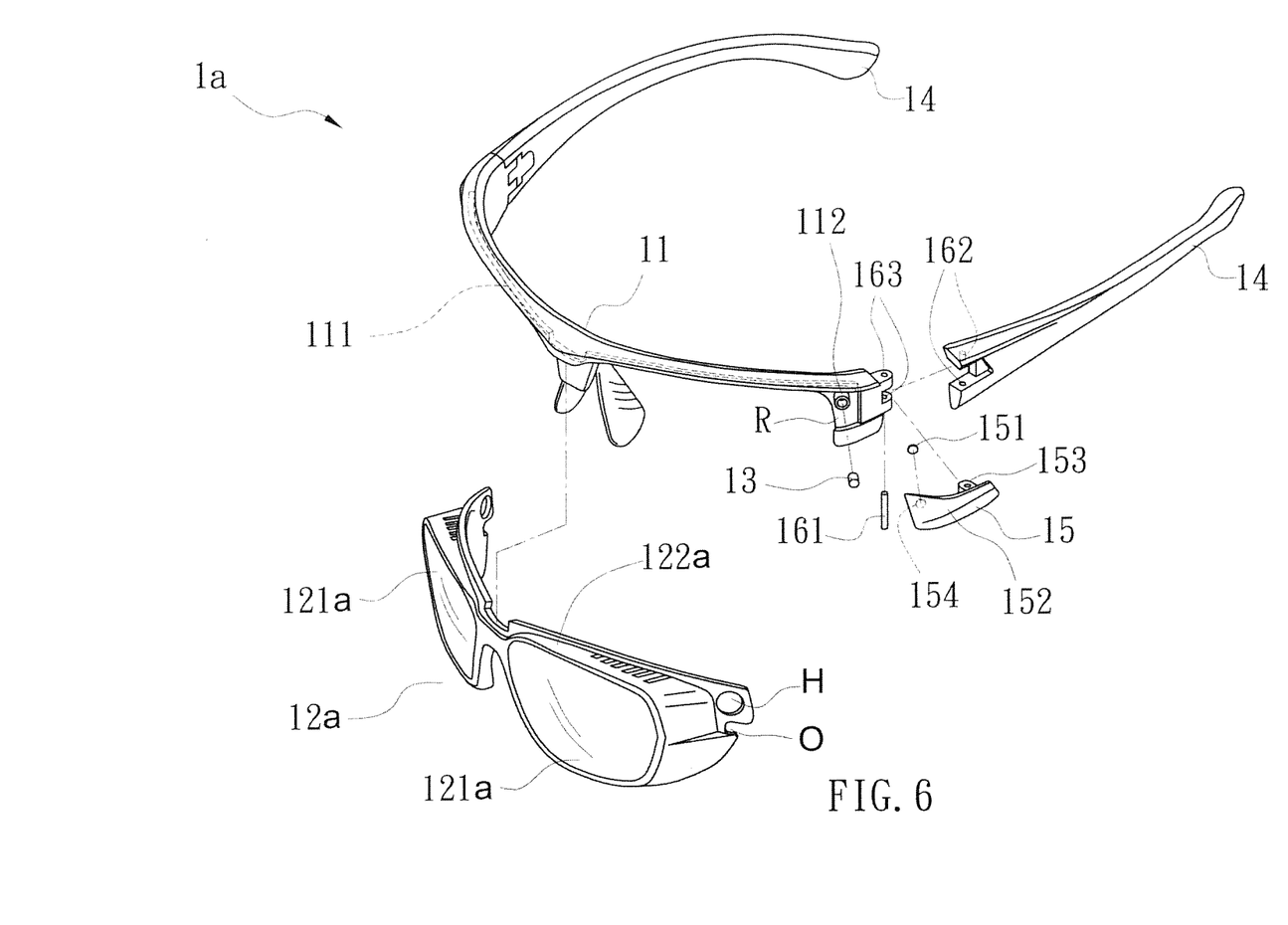
FIG. 6 is a schematic diagram of an eye-lens device of another preferred embodiment of this invention.

FIG. 6 is a schematic diagram of an eye-lens device 1a of a second embodiment of this invention. Different from the eye-lens device 1, the lens unit 12a of the eye-lens device 1a includes two separate lenses 121a and a frame portion 122a. The lenses 121a are fixed to the frame portion 122a, and the frame portion 122a can be disposed to the lens-holding portion. Besides, the lens unit 12a has a through hole H and an opening O. Herein, the through hole H and the opening O (maybe a through hole otherwise) are both disposed to the frame portion 122a.

Figure 7:
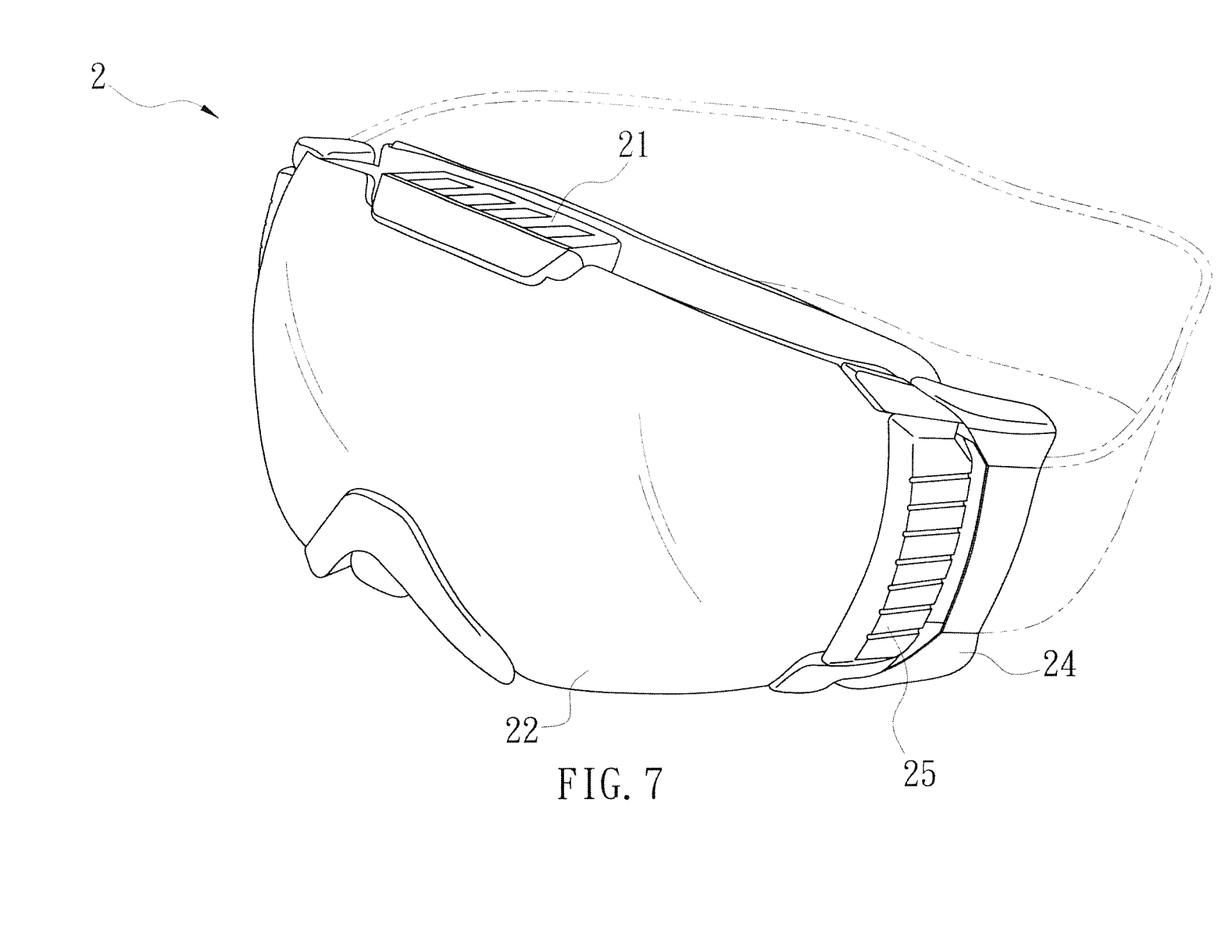
FIGS. 7 to 9 are schematic diagrams of an eye-lens device according to another preferred embodiment of this invention.
Figure 8:
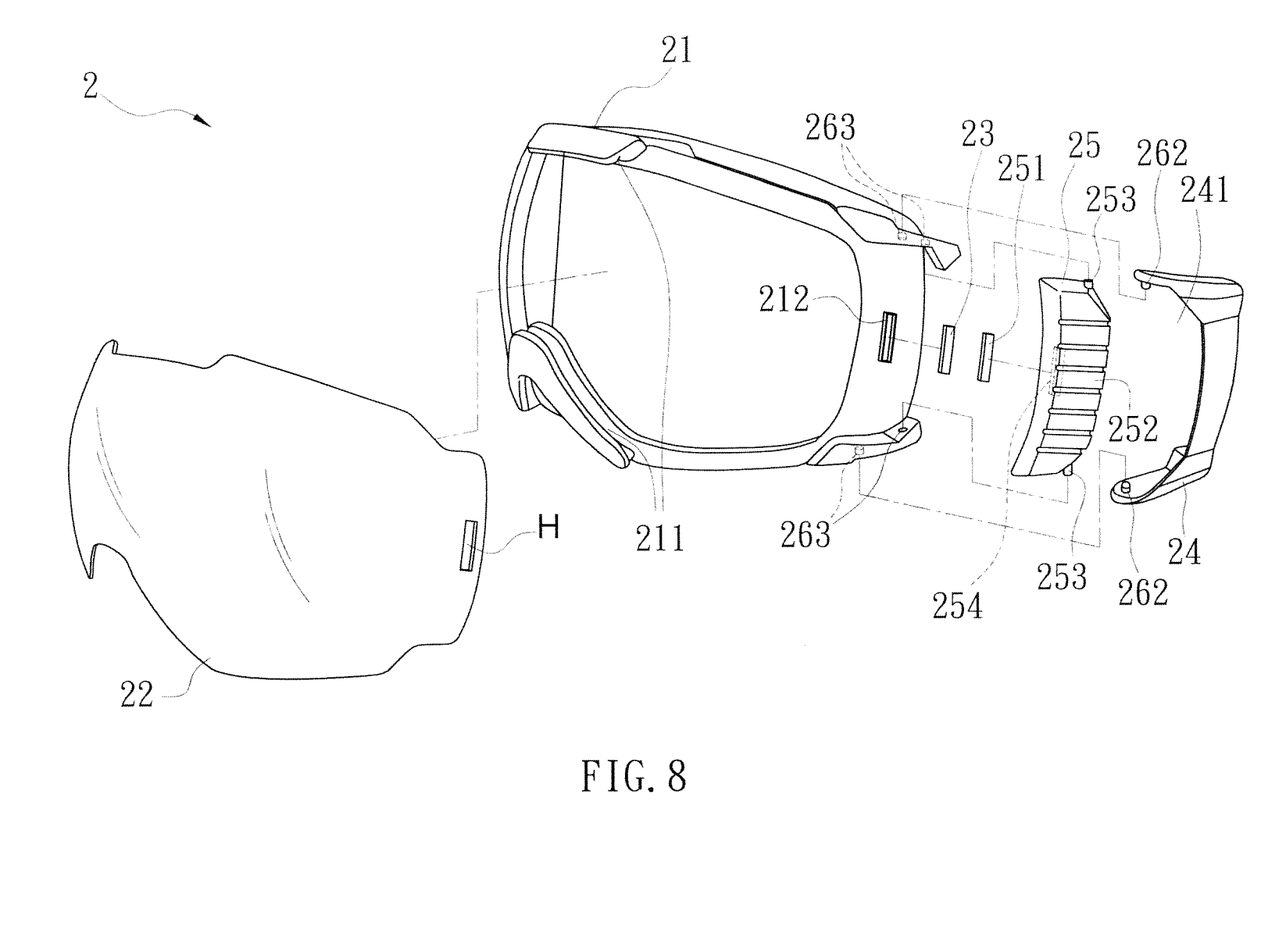

FIGS. 7 and 8 are schematic diagrams of an eye-lens device 2 according to another preferred embodiment of this invention. FIG. 7 is a schematic diagram of the eye-lens device 2, and FIG. 8 is a schematic diagram showing partial exploded structure of the eye-lens device 2. Herein, the eye-lens device 2 is a snow glasses for example. As shown in FIGS. 7 and 8, the eye-lens device 2 includes a frame 21, at least one lens unit 22, two first magnets 23 and two fasteners 25.

The frame 21 can be modified according to the form of the lens unit 22. The frame 21 has at least one lens-holding portion 211 and two magnet-seats 212. The lens-holding portion 211 is for fixing the lens unit 22. In this embodiment, the lens-holding portion 211 has a slot for holding the lens unit 22.

The magnet-seat 212 is for fixing a first magnet 23. In this embodiment, the magnet-seats 212 are respectively disposed on opposite sides of the frame 21, and here for example, are disposed on two outer sides of the frame 11.

The lens unit 22 includes at least one lens, and here includes only one lens, which, however, covers the range of two eyes of the user. The lens is held by the lens-holding portions 211, and can be accommodated or clipped in the slot of the lens-holding portion 211. Besides, the lens unit 22 can have two holes H so that the first magnet 23 and a second magnet 251 can pass through the hole H to connect each other. Furthermore, the hole H can be a closed hole or an open hole, and the closed hole is instanced in this embodiment. By the way, the open hole means the hole is formed by concaving the edge of the lens unit 22.

The first magnets 23 are respectively disposed in the magnet-seats 212. Herein, the magnet-seat 212 has a hole, and the first magnet 23 can be accommodated in the hole and thus fixed tightly in the magnet-seat 212. Here, the magnet-seat 212 is formed by concaving the frame 21. In other embodiments, the first magnet 23 can be fixed to the magnet-seat 212 by other ways, such as by an adhesive or a clip.

The eye-lens device 2 of this embodiment can further include two band-seats 24, which are respectively connected to opposite sides of the frame 21. Herein, the band-seats 24 are disposed pivotally to the frame 21 so as to rotate relative to the frame 21. In other embodiments, the band-seats 24 can be fixed to the frame 21. A user can set a band to the band-seats 24. In this embodiment, the band-seat 24 is not limited in form and material, and it can be made by metal, alloy or plastic material. The band-seat 24 has an opening 241 to allow the fastener 25 to rotate. In this embodiment, the band-seat 24 is disposed pivotally to the frame by a pivoting structure so as to rotate relative to the frame 21. The pivoting structure includes a plurality of protrusions 262 and a plurality of indentations 263. The protrusions 262 are disposed on the band-seat 24 and the indentations 263 are disposed on the frame 21. By the cooperation of the protrusions 262 and the indentations 263, the band-seat 24 can be disposed pivotally to the frame 21. The pivoting structure as mentioned above is just for example, but not for limiting the scope of the invention. Other kinds of pivoting structures also can be applied to this embodiment.

The fastener 25 is disposed pivotally to the frame 21, and includes a second magnet 251. The fastener 25 of the invention is not limited in form and material. For example, the fastener 25 can be made by metal, alloy or plastic material. Herein, the fastener 25 includes a blocking portion 252, a pivoting portion 253, and a containing portion 254. The pivoting portion 253 is used to make the fastener 25 disposed pivotally on the frame 21. Herein, the pivoting portion 253 consists of a plurality of protrusions, and can pass through the indentations 263 on the frame 21 to constitute a pivoting structure whereby the fastener 25 can be disposed pivotally to the frame 21. In this embodiment, the fastener 25 and the band-seat 24 are disposed pivotally to the frame 11 by different axles. The containing portion 254 is used to accommodate the second magnet 251.

Figure 9:
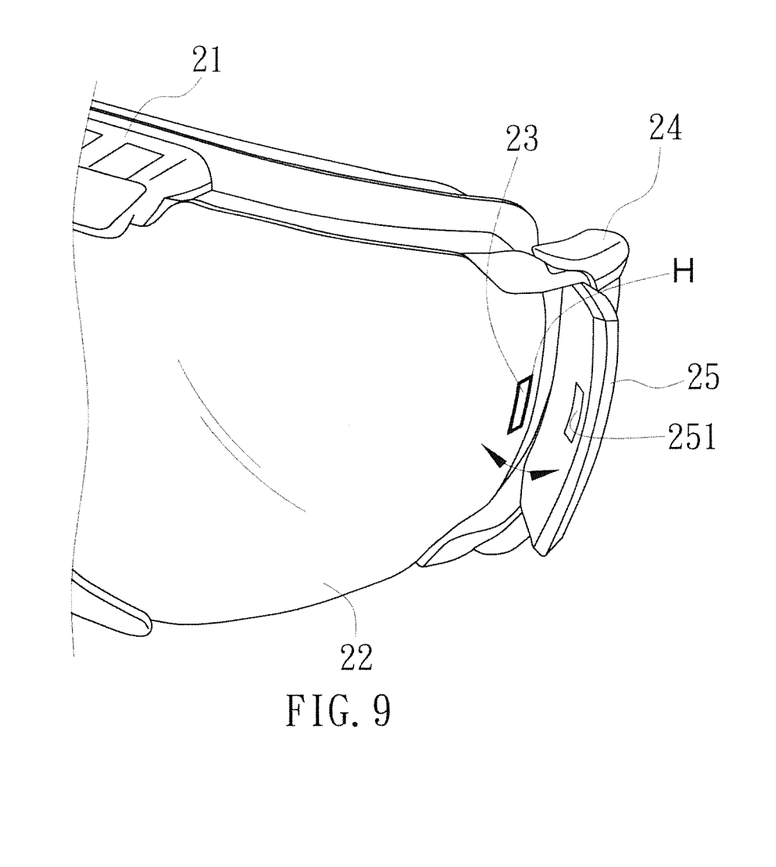

The fastener 25 can rotate relative to the frame 21, causing the first magnet 23 and the second magnet 251 to attract each other to fix the lens unit 22. FIG. 9 is a schematic diagram of the rotation of the fastener 25. As shown in FIG. 9, when the fastener 25 rotates and the second magnet 251 comes closer to the first magnet 23, the lens of the lens unit 22 is fixed by the attraction of the first and second magnets 23 and 251. Besides, the attraction of the first and second magnets 23 and 251 also causes the fastener 25 to be fixed. As shown in FIG. 9, the fastener 25 presses and fixes an outer surface (the surface far from the user's eyes) of the lens unit 22, and in detail, the outer surface is blocked by the blocking portion 252 of the fastener 25. When the fastener 25 rotates again and thus the second magnet 251 separates from the first magnet 23, the lens unit 22 will be taken off. Besides, the largest rotation angle of the fastener 25 is limited by the band-seat 24.

To be noted, the first magnet and the second magnet as mentioned above can be composed of two magnets, or a magnet and a magnetic device. The magnetic device is, for example, metal, alloy or other magnetic materials.

In summary, according to the eye-lens device of the invention, the frame includes a first magnet and the fastener includes a second magnet. Besides, the fastener is disposed pivotally to the frame and can rotate relative to the frame. When the fastener rotates relative to the frame, the first magnet and the second magnet can attract each other so that the lens unit and the fastener can be both fixed. Besides, when the fastener rotates again to make the second magnet separate from the first magnet, the lens unit will be taken off. Accordingly, either the assembly or disassembly, the lens doesn't need to be pushed hard into the slot of the frame (as the conventional art) so that the lens can be prevented from being damaged. Therefore, the lens of the eye-lens device of the invention is very easy to be fixed, thereby improving the usability and extending the lifespan of the product. Besides, with the convenient assembly and disassembly of the invention, the user can easily replace the lens.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An eye-lens device, comprising:
   a frame including at least one lens-holding portion and two magnet-seats;
   at least one lens unit disposed to the lens-holding portion;
   two first magnets respectively disposed to the magnet-seats;
   two fasteners, each of which is disposed pivotally to the frame and includes a second magnet, wherein the lens unit is fastened by the attraction of the first and second magnets when the fasteners rotate relative to the frame; and
   two temples respectively connected to opposite sides of the frame;
   wherein the temple and the corresponding fastener are disposed pivotally to the frame by the same axle.

2. The eye-lens device as recited in claim 1, wherein the lens unit includes a lens or two lenses.

3. The eye-lens device as recited in claim 2, wherein the lens unit further includes a frame portion, the lens is fixed to the frame portion, and the frame portion is disposed to the lens-holding portion.

4. The eye-lens device as recited in claim 1, wherein the magnet-seats are respectively disposed to opposite sides of the frame.

5. The eye-lens device as recited in claim 1, wherein each of the fasteners is disposed pivotally to the frame by a pivoting structure.

6. The eye-lens device as recited in claim 1, wherein the first magnet and the second magnet are composed of two magnets, or a magnet and a magnetic device.

7. The eye-lens device as recited in claim 6, wherein the magnetic device is metal or alloy.

8. An eye-lens device, comprising:
   a frame including at least one lens-holding portion and two magnet-seats;
   at least one lens unit disposed to the lens-holding portion;
   two first magnets respectively disposed to the magnet-seats;
   two fasteners, each of which is disposed pivotally to the frame and includes a second magnet, wherein the lens unit is fastened by the attraction of the first and second magnets when the fasteners rotate relative to the frame; and
   two temples respectively connected to opposite sides of the frame;
   wherein each of the temples has an opening to allow the rotation of the corresponding fastener.

9. An eye-lens device, comprising:
   a frame including at least one lens-holding portion and two magnet-seats;
   at least one lens unit disposed to the lens-holding portion;
   two first magnets respectively disposed to the magnet-seats; and
   two fasteners, each of which is disposed pivotally to the frame and includes a second magnet, wherein the lens unit is fastened by the attraction of the first and second magnets when the fasteners rotate relative to the frame;
   wherein the lens unit has two holes, and the first and second magnets pass through the through hole to connect each other.

10. The eye-lens device as recited in claim 9, wherein the hole is a through hole, or formed by concaving an edge of the lens unit.

11. An eye-lens device, comprising:
   a frame including at least one lens-holding portion and two magnet-seats;
   at least one lens unit disposed to the lens-holding portion;
   two first magnets respectively disposed to the magnet-seats;
   two fasteners, each of which is disposed pivotally to the frame and includes a second magnet, wherein the lens unit is fastened by the attraction of the first and second magnets when the fasteners rotate relative to the frame; and
   two band-seats respectively connected to opposite sides of the frame.

12. The eye-lens device as recited in claim 11, wherein each of the band-seats has an opening to allow the rotation of the corresponding fastener.

13. An eye-lens device, comprising:
- a frame including at least one lens-holding portion and two magnet-seats;
- at least one lens unit disposed to the lens-holding portion;
- two first magnets respectively disposed to the magnet-seats; and
- two fasteners, each of which is disposed pivotally to the frame and includes a second magnet, wherein the lens unit is fastened by the attraction of the first and second magnets when the fasteners rotate relative to the frame;
- wherein the fasteners respectively have supporting portions, the lens unit has two openings or through holes, and the supporting portions are disposed to the openings or through holes by the rotations of the fasteners, respectively.

\* \* \* \* \*